United States Patent [19]
Wohlabaugh

[11] 3,843,864
[45] Oct. 22, 1974

[54] GAP CONDITION DETECTOR CIRCUIT
[75] Inventor: Leonard M. Wohlabaugh, Miller Place, N.Y.
[73] Assignee: Eltee Pulsitron, West Caldwell, N.J.
[22] Filed: Mar. 21, 1973
[21] Appl. No.: 343,484

[52] U.S. Cl............................ 219/69 C, 219/69 G
[51] Int. Cl.............................................. B23k 9/16
[58] Field of Search.... 219/69 C, 69 P, 69 D, 69 G, 219/69 S; 315/186; 318/650

[56] References Cited
UNITED STATES PATENTS
| | | | |
|---|---|---|---|
| 3,531,616 | 9/1970 | Sennowitz | 219/69 G |
| 3,558,844 | 1/1971 | Lobur | 219/69 G |
| 3,655,936 | 4/1972 | Saito et al. | 219/69 P |
| 3,699,301 | 10/1972 | Losey | 219/69 S |
| 3,705,286 | 12/1972 | Kondo et al. | 219/69 S X |
| 3,739,136 | 6/1973 | Marendaz | 219/69 G X |

Primary Examiner—E. A. Goldberg
Assistant Examiner—Hugh D. Jaeger
Attorney, Agent, or Firm—Clarence A. O'Brien & Harvey B. Jacobson

[57] ABSTRACT

A device for detecting the gap condition of electric discharge machining operations and effecting retraction of the work electrode, flushing of the workpiece, and interruption of the current pulses to the electrode when a preselected current is exceeded. The device includes means for adjusting the sensitivity, as well as the time of electrode retraction. In addition, the operating current range may be selected through a group of current limiting resistors each providing an input signal and isolated from the other resistors by way of a diode matrix.

5 Claims, 6 Drawing Figures

GAP CONDITION DETECTOR CIRCUIT

The present invention is generally related to electric discharge machining (EDM) and more particularly to an improved gap condition detector which simultaneously effects retraction of the machine electrode and disconnection thereof from the main power supply when a preselected work gap current is exceeded.

It is well known that arcs or excessive currents in EDM are often harmful to the workpiece, the electrode, or both. As such, various arrangements have been proposed to prevent or control such arcing or high current conditions at the work gap. One of the more common arrangements provides automatic withdrawal or retraction of the work electrode by way of a servo when adverse gap conditions are sensed. However, under many conditions, the arc is not extinguished, but rather, is pulled along with the electrode as it is retracted. This is particularly true when high energy density is employed in the machining process. Other devices have been proposed for use in conjunction with the electrode servo or feed mechanism which immediately interrupt the current to the electrode when arcing or a tendency to arc at the gap is detected. Such conventional devices, however, have met with only marginal success due to the fact that they are over-sensitive and often interrupt the current unnecessarily, greatly reducing the efficiency of the entire system.

Other conventional safety devices have been proposed which are responsive to the voltage in the gap when it falls below a predetermined value. These devices, also, have met with only limited success, as the arc voltage, integrated overtime, may sometimes be greater than the integrated voltage of the individual pulses. Therefore, in many situations, these devices did not respond quickly enough to the arc which continued to burn for a relatively long time even though the electrode was being withdrawn.

More recently, systems have been proposed which respond to the gap current to actuate a relay, when the current exceeds a particular value. One such system is disclosed by U.S. Pat. No. 3,439,146 to Ullman et al. This system includes a resistor in series with the work gap and connected in parallel with a Zener diode and an integrating capacitor, which in turn is in parallel with a control relay. Acutation of the relay is effected only when the capacitor is fully charged. Closure of the relay causes actuation of the electrode feed mechanism to retract the electrode from the work gap. The Ullman circuit is limited in its response to a fixed maximum gap current, which greatly limits the use of the circuit to those applications utilizing currents within a relatively narrow range. Furthermore, the sensitivity of the Ullman circuit is limited by the Zener diode and integrating capacitor.

It is an object of the present invention to provide an improved gap condition detector for EDM which overcomes the above-mentioned deficiencies.

Another object of the present invention is to provide a novel gap condition detector including a group of paralleled current limiting resistors in series with the EDM work gap, with each resistor connected to a power transistor and isolated from the others by way of a diode matrix to provide input signals, whereby the gap condition detector may be utilized over a wide current range by appropriately switching the resistors in and out of the circuit.

It is a further object of the present invention to provide a versatile gap condition detector including means for comparing the voltage sensed across one or more current limiting resistors to a reference voltage to initiate various functions, such as electrode retraction, in response to predetermined gap current conditions.

Still another object of the present invention is to provide a unique gap condition detector including means for selectively adjusting the sensitivity and retraction time interval of the work electrode to assure satisfactory operation for a wide variety of EDM applications.

It is a further object of the present invention to provide a gap condition detector which is capable of extremely rapid response to EDM gap conditions to appropriately control functions, such as electrode retraction, power cut-off, and dielectric flushing in order to prevent damage to the workpiece or to the electrode.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 4a is a schematic diagram of a preferred embodiment of the circuitry of the gap condition detector illustrated in FIG. 3a.

Figure 1:
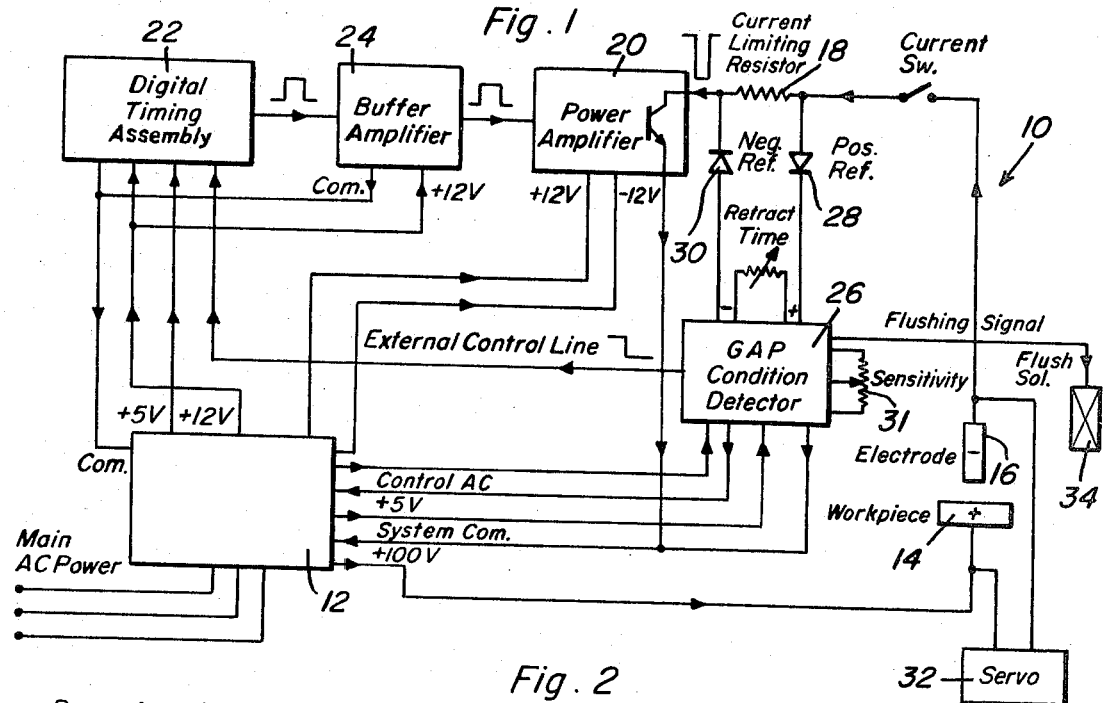
FIG. 1 is a block diagram of the gap condition detector of the present invention utilized in a typical EDM circuit.

Referring now, more particularly, to FIG. 1 of the drawings, a block diagram of a typical EDM system utilizing the gap condition detector of the present invention is generally indicated by the numeral 10 and includes a main power supply 12 which furnishes 100 VDC, or other appropriate voltage, to a workpiece 14 and work electrode 16. Current flows from electrode 16 through at least one current limiting resistor 18 and power amplifier 20. The power amplifier includes at least one power transistor which is connected in a common emitter configuration with the collector in series with the current limiting resistor 18. The power transistor is turned on and off by way of pulses received from a digital timing assembly 22 by way of a buffer amplifier 24.

The gap condition detector is indicated by the numeral 26 and is provided with an input which is connected across current limiting resistor 18. The voltage drop across the current limiting resistor is representative of the current at the work gap. In practice, several current limiting resistors are utilized, each being connected in series to a power transistor. Isolation between the current limiting resistors is provided by way of positive and negative reference diodes, such as indicated at 28 and 30.

The gap condition detector is provided with a sensitivity adjustment 31 which is utilized to select a reference voltage which is compared to the voltage developed across the current limiting resistors. When the voltage drop detected across the current limiting resistors exceeds the reference voltage, an output signal of logical 0 is fed from the gap condition detector to the digital timing assembly 22 to shut off the timing signal, thereby inhibiting operation of the power amplifier. Preferably, the digital timing assembly is similar to that disclosed by U.S. Pat. No. 3,697,879 issued to Jack D. Holliday Oct. 10, 1972. Of course, if desired, other timing assemblies may be utilized. The logical 0 signal is also effective to retract the machine electrode by way of a conventional servo mechanism 32 for a preselected retract time interval. In addition, the gap condition detector may effect operation of a flush solenoid 34 which causes flushing of the workpiece with an appropriate dielectric fluid. After the retract time interval is completed, the output of the gap condition detector is returned to a logical 1 to enable the timing assembly 22. This causes return of the work electrode, with flush solenoid 34 being de-energized and current flow restored across the work gap.

Figure 2:
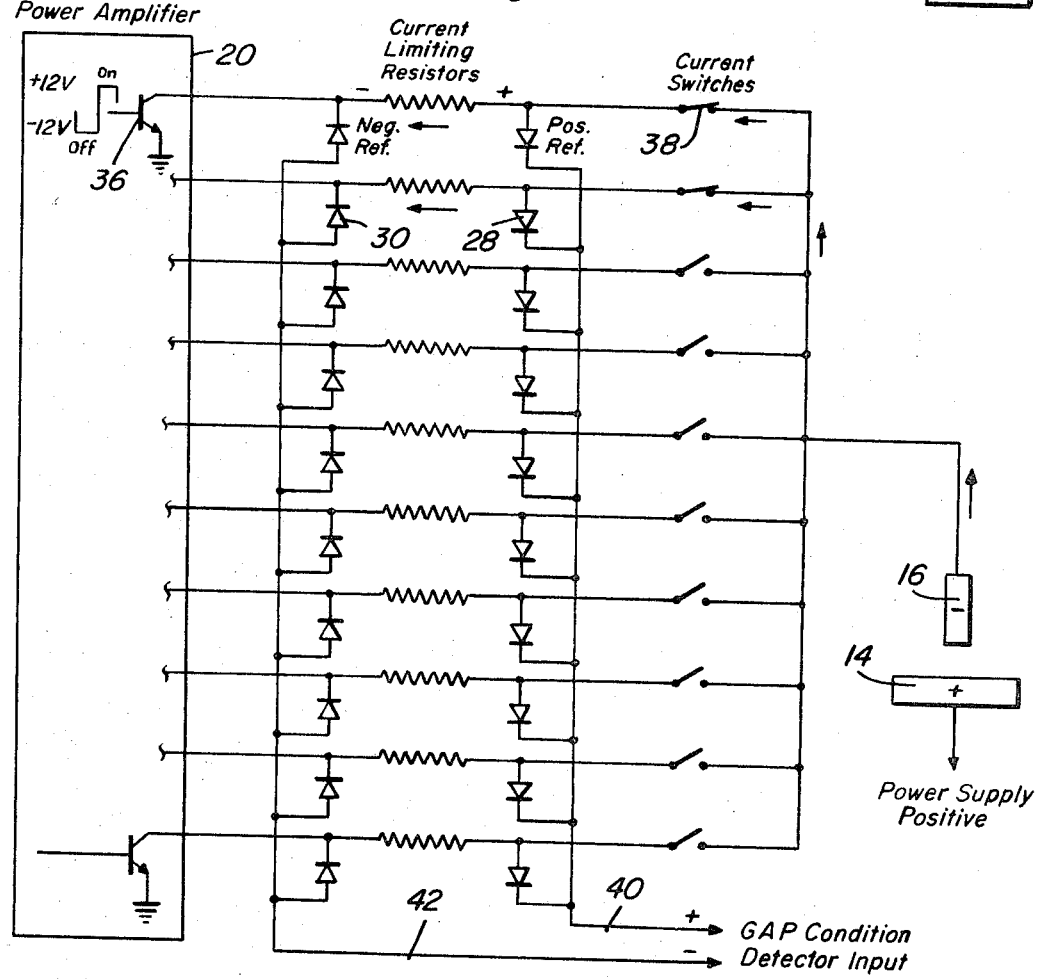
FIG. 2 is a schematic diagram of the current limiting resistors and diode matrix arrangement associated with the gap condition detector of the present invention.

Referring now, more particularly, to FIG. 2 of the drawings, a schematic diagram of the current limiting resistors and associated diode matrix is illustrated. As mentioned above, in practice several current limiting resistors are connected between the work electrode and the power amplifier. Each current limiting resistor 18 is connected to a separate power transistor, such as that indicated at 36 associated with the power amplifier 20. Only two power transistors are shown in FIG. 2 for the sake of clarity. Since the current carrying capacity of power transistors is limited, by providing several power transistors, each connected to a current limiting resistor, the total current capability of the power amplifier is greatly increased. This provides a wide current range for the EDM, rendering it readily adaptable to many EDM applications. Preferably, a group of switches, such as indicated at 38, is provided whereby the resistors may be conveniently switched in or out of the circuit depending upon the current requirements of the particular application. With two of the switches 38 closed, as illustrated in FIG. 2, the current flowing from the work electrode splits between the two associated current limiting resistors as indicated by the current flow arrows. It should be noted that a greater or lesser number of resistors and transistors may be provided in the circuit depending upon the particular current range requirements.

As mentioned above, the input signals to the gap condition detector circuit are provided by the voltage drops across the respective current limiting resistors. Since each resistor is connected to a separate power transistor, it is essential that isolation be maintained between the resistors. This is achieved by way of positive and negative reference diodes, as indicated at 28 and 30, respectively. Each positive reference diode 28 is connected between the positive side of the associated resistor and a common positive line 40 to the input of the gap condition detector circuit. Each negative reference diode 30 is connected in an opposite direction between the negative side of the associated current limiting resistor and a common negative line 42 to the gap condition detector circuit. The positive and negative outputs of the diodes are fed to the input of the detector circuit, whereby the detector circuit sees the maximum voltage drop across the current limiting resistors. While the drops across the resistors are theoretically equal, in practice they may vary slightly due to different characteristics of the power transistors. Thus, the reference diodes which define a diode matrix not only provide isolation between the current limiting resistors but also compensate for slight differences in the power transistor characteristics. This assures that the gap condition detector responds rapidly and more accurately to a high current condition.

Figure 3:
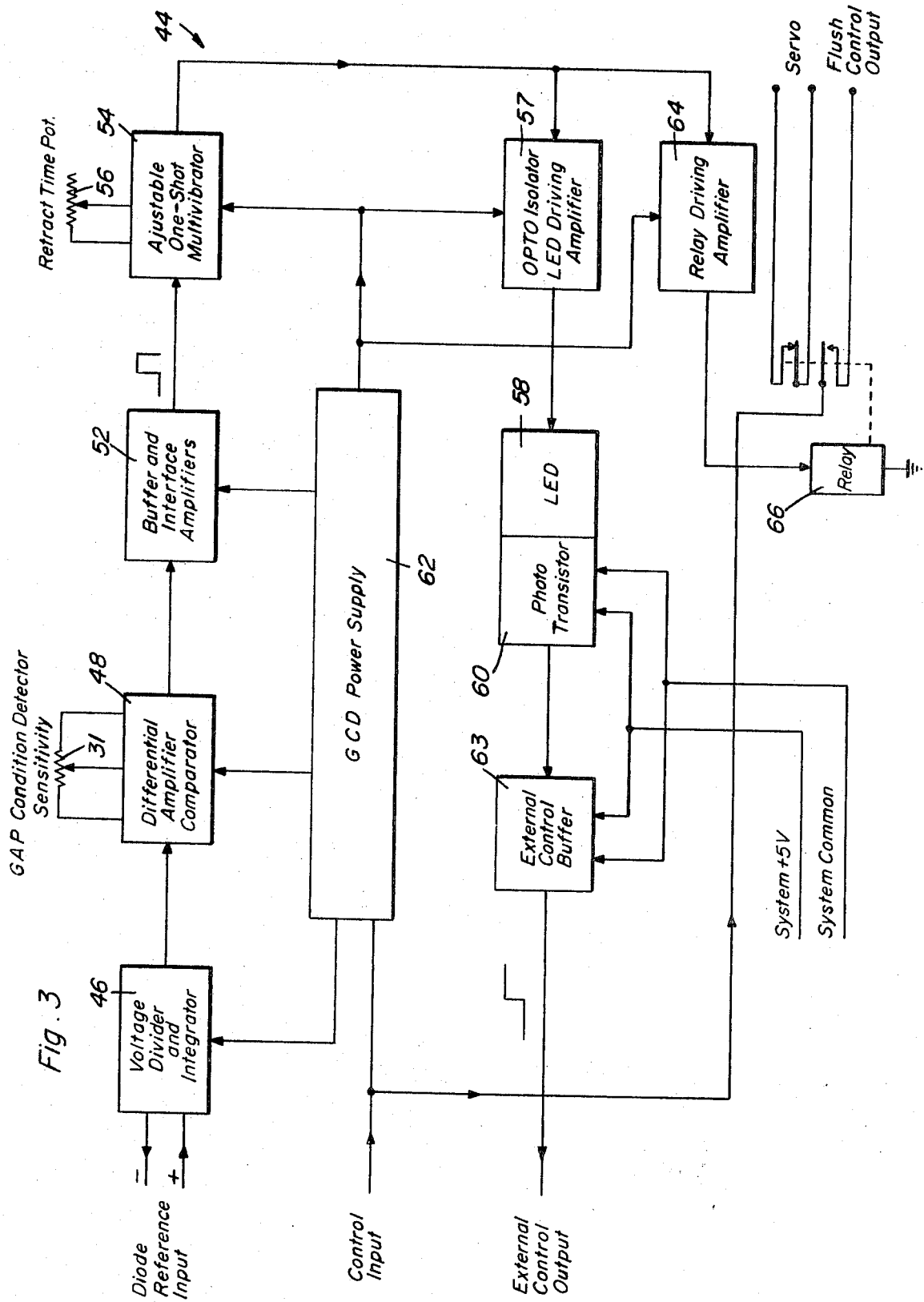
FIG. 3 is a block diagram of a first embodiment of the gap condition detector of the present invention.

Referring now, to FIG. 3 of the drawings, the block diagram of the gap condition detector is generally indicated by the numeral 44 and includes a voltage divider and integrator circuit 46 which receives the input signals from the above described reference diodes. The output signals from voltage divider and integrator 46 are applied to a differential amplifier comparator 48, where they are compared to a reference voltage which is selected by way of a sensitivity control in the form of a potentiometer indicated at 31. If the signals from the voltage divider and integrator are greater than the reference voltage (i.e. a high current condition), an output of logical 0 is fed to buffer and interface amplifiers indicated at 52, which in turn provide a logical 1 output which triggers an adjustable one-shot multivibrator 54. The multivibrator is provided with a retract time potentiometer 56, or similar means, which permits selective adjustment of the retract time interval and thus the one-shot time. Preferably, this interval is infinitely adjustable over a range of 0.5–5.0 seconds.

The output of multivibrator 54 is fed to an OPTO isolator and LED driving amplifier 57, and is effective to turn such on. The output of the driving amplifier is fed to a light emitting diode (LED) 58 which turns on a phototransistor 60.

It will be appreciated at this point that the gap condition detector is provided with its own "floating" power supply 62 which furnishes power to the above described sections of the gap condition detector. The LED 58 and phototransistor 60 provide isolation between the gap condition detector power supply and the main EDM power supply. This isolation is required for stability since the gap condition detector is, in effect, measuring the current in the machining or work gap which is constantly varying and is generated by the main power supply of the EDM. The output of phototransistor 60 is fed to an external control buffer 63 which changes the signal from a logical 1 to a logical 0 to inhibit the timing assembly 22, shown in FIG. 1. This interrupts the current flow to the work gap, initiates retraction of the work electrode, and initiates dielectric flushing of the work piece. The output of multivibrator 54 is also fed to a relay driving amplifier 64 which effects operation of a relay 66 for energization of the flush solenoid and actuation of the servo in a retraction mode in a conventional manner.

Figure 4A:
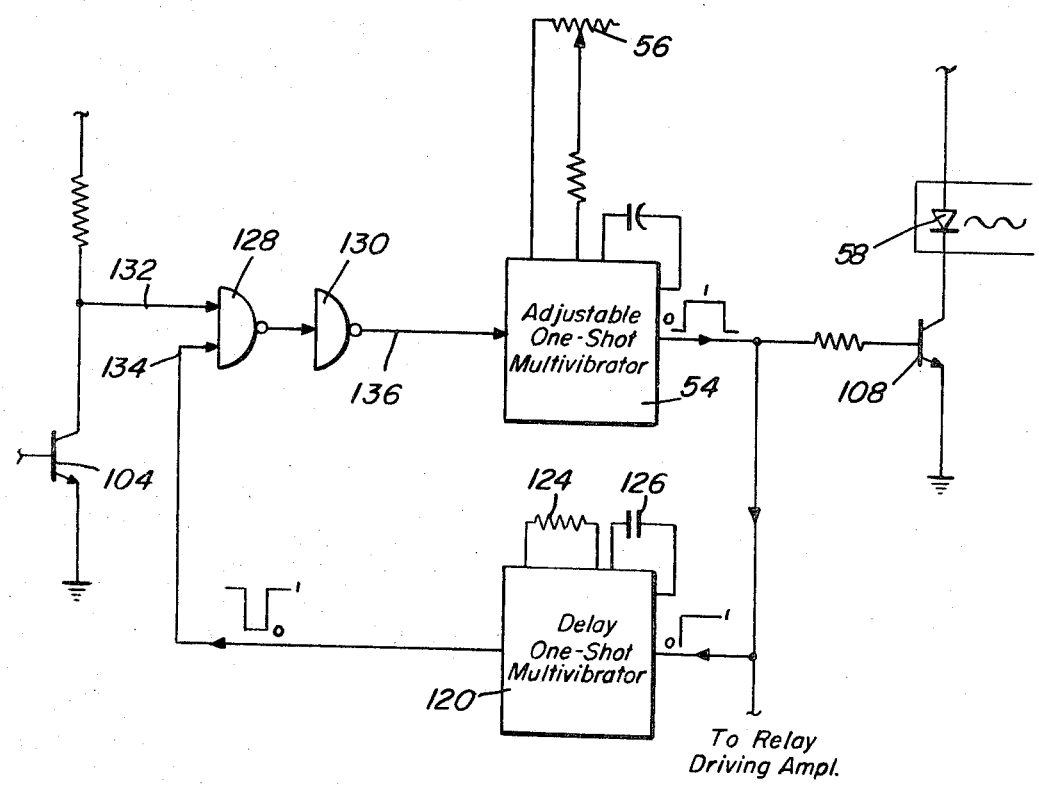
Figure 4:
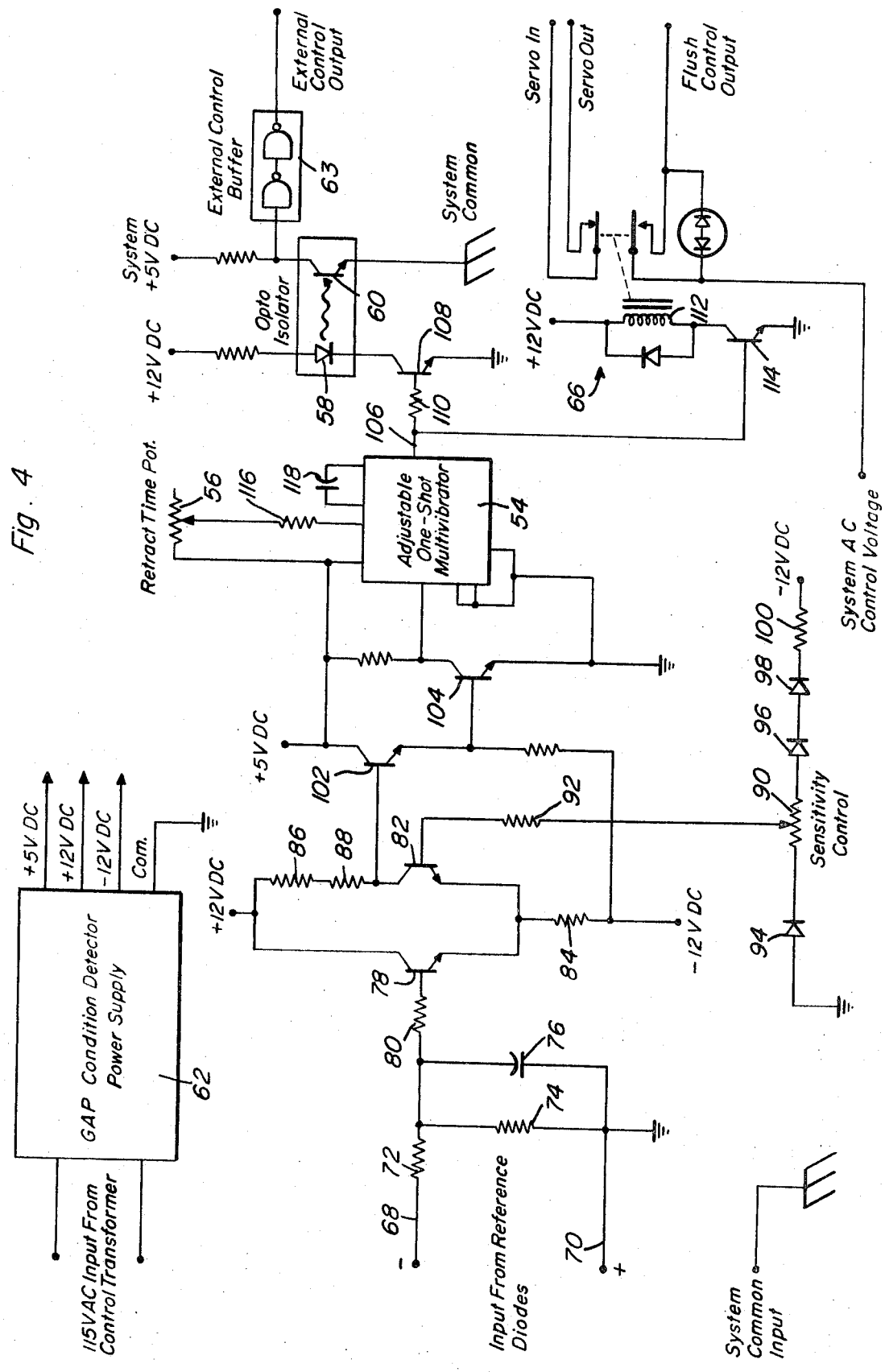
FIG. 4 is a schematic diagram of a preferred embodiment of the circuitry of the gap condition detector illustrated in FIG. 3.

Referring to FIG. 4 of the drawings, operation of the gap condition detector circuit will be explained in more detail. The gap condition detector power supply 62 is provided with appropriate DC output voltages, preferably, of +5 VDC, +12 VDC, and −12 VDC. A voltage input signal from the reference diodes is received by input lines 68 and 70 and is divided across resistors 72 and 74. Preferably, this provides a ten-to-one voltage divider. A capacitor 76 is parallel with resistor 74 to define an integrator for the input voltage. The integrated voltage signal is fed to the base of a transistor 78 by way of a current limiting resistor 80. A second transistor 82 and transistor 78 together define a differential amplifier which compares the integrated input voltage signal to a reference voltage. The collector of transistor 78 is connected directly to +12 VDC, with the emitter of transistor 78 being connected to that of transistor 82 and to −12 VDC by way of a resistor 84. The collector of transistor 82 is connected to +12 VDC by way of resistors 86 and 88, while the base of transistor 82 is connected to the sensitivity adjustment potentiometer 90 by way of resistor 92. The sensitivity control is provided with diodes 94, 96, and 98 which are serially connected to potentiometer 90 and resistor 100, which in turn is connected to −12 VDC. This provides a minimum reference voltage when the potentiometer 90 is set to the extreme left and a maximum reference voltage when set to the extreme right. Preferably, the circuit parameters are such that the reference voltage may be set between −0.7 V and −7.0 V.

As pointed out above, the reference voltage applied to the base of transistor 82 is compared to the integrated input signal voltage impressed upon the base of transistor 78. If the input voltage signal is zero transistor 82 will conduct, while transistor 78 will be rendered non-conductive. This causes the collector of transistor 82 to be driven more negative, which in turn causes a third transistor 102 to conduct. A fourth transistor 104 is base connected to the emitter of transistor 102, such that when transistor 102 conducts, transistor 104 is also driven into conduction. The collector of transistor 104 is connected to the adjustable one-shot multivibrator 54 which is a commercially available integrated circuit. When transistor 104 conducts, a logical 0 input is provided to the multivibrator, in which case the multivibrator is rendered inoperative, and provides a logical 0 output at line 106. A fifth transistor 108 is base connected to line 106 by way of a resistor 110 and is non-conductive when the output of multivibrator is of a logical 0. The LED diode 58 is connected to the collector of transistor 108, such that it will not emit light until transistor 108 is rendered conductive. Under these conditions, phototransistor 60 is also non-conductive, such that the output of control buffer 63 remains in a logical 1. This enables the digital timing assembly 22 to operate, whereby current is provided to the work gap. A coil 112, associated with relay 66, is connected to the collector of a seventh transistor 114, the base of which is connected to output line 106. With the output of the multivibrator at a logical 0, transistor 114 is not biased into conduction, such that relay 66 is not operated, and the servo and flush controls are not actuated.

In the event that the gap current exceeds a preselected value, the input voltage signal to the base of transistor 78 will exceed the reference voltage to the base of transistor 82. This causes transistor 78 to conduct, while transistor 82 is turned off. This turns off transistors 102 and 104 to provide a logial 1 input to multivibrator 54. This initiates the retract time interval which is determined by the setting of the retract time potentiometer 56. A logical 1 is provided to the output line 106 of the multivibrator which causes transistors 108 and 114 to conduct. This, in turn, causes current flow through LED 58 which renders phototransistor 60 conductive and provides a logical 0 output from control buffer 63. Conduction by transistor 114 energizes relay coil 112 which effects operation of the servo to initiate retraction of the work electrode. In addition, the flush control solenoid is energized to flush the work gap with an appropriate dielectric fluid.

This operation continues until the selected retract time interval has been completed, at which time the output of multivibrator 54 returns to a logical 0, which enables the digital timing assembly, initiates return of the work electrode, and terminates flushing of the work gap with the dielectric fluid. It will be appreciated that the retract time interval is determined by a conventional timer circuit which is defined by the retract time potentiometer 56 connected in series with a resistor 116, which together are connected to a timing capacitor 118 in a conventional manner.

Figure 3A:
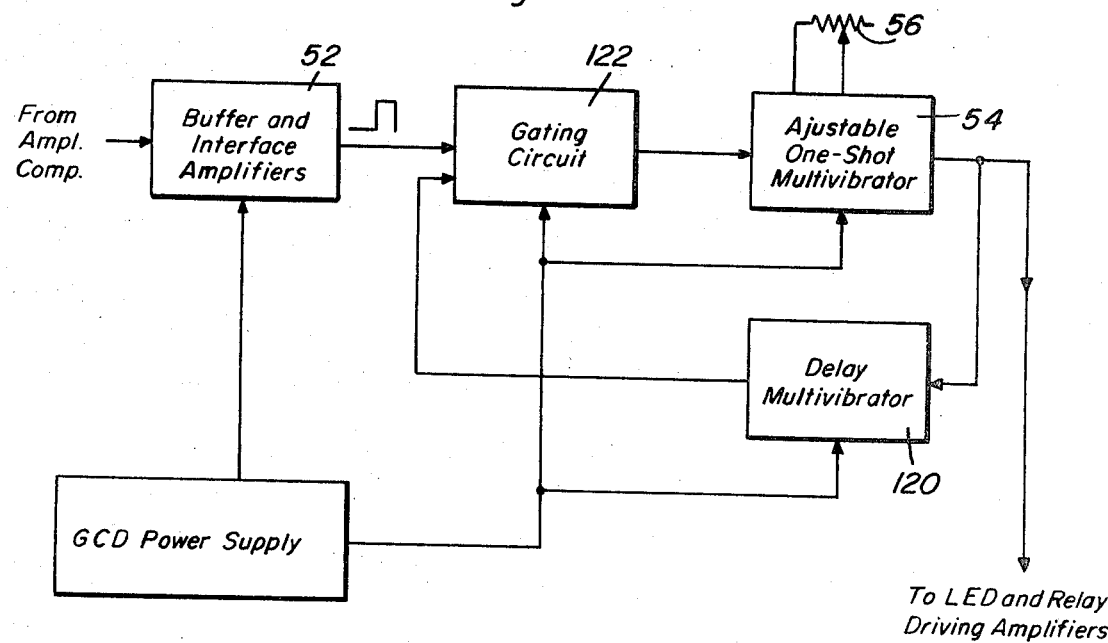
FIG. 3a is a block diagram of a second embodiment of the gap condition detector of the present invention.

Referring now to FIG. 3a of the drawings, a block diagram of a second embodiment of the multivibrator section of the gap condition detector is illustrated and is similar to that shown in FIG. 3, but includes the addition of a delay multivibrator and gating circuit which enhance the operational performance of the gap condition detector in applications requiring deep cavity machining. More particularly, the embodiment illustrated in FIG. 3a is capable of compensating for short circuits which are detected during operation of the one-shot multivibrator. With the first embodiment illustrated in FIG. 3, high current or short circuit conditions detected during operation of the one-shot multivibrator are ineffective to retrigger the multivibrator which is already in a logical 1 state and remains there until the retract time has been completed.

The second embodiment illustrated in FIG. 3a is provided with a delay one-shot multivibrator 120 connected between the output of adjustable one-shot multivibrator 54 and a gating circuit 122. Delay multivibrator 120 detects logic changes in output of one-shot multivibrator 54, such that when the output transitions from logical 1 to logical 0, as when multivibrator 54 times out, the delay multivibrator 120 is triggered for a predetermined time, causing it to transition low to a logical 0. This, in turn, causes a transition in the output of gating circuit 122 which is effective to retrigger one-shot multivibrator 54. This retriggering continues until the short circuit condition has been removed.

Referring to FIG. 4a, a schematic diagram of the preferred circuitry corresponding to block diagram 3a through the block diagram illustrated in FIG. 3a may be observed. The delay one-shot multivibrator 120 is provided with a preselected time delay resistor 124 and capacitor 126. The resistance and capacitance parameters are preselected to provide sufficient delay to achieve the above-described retriggering of multivibrator 54. A typical time delay would be 100 microseconds. Gating circuit 122, illustrated in FIG. 3a, includes a pair of NAND gates 128 and 130 which provide appropriate logic transitions for triggering and retriggering multivibrator 54. The output of delay multivibrator 120 is normally setting at a logical 1. When multivibrator 54 times out and goes to a logical 0, the output of multivibrator 120 transitions to a logical 0 for the preset time. Assuming that transistor 104 is non-conductive, under a high current or a short circuit condition, as explained above, input line 132 to gate 128 will be at a logical 1. With the input to gate 128 from line 130 at a logical 0, the output of gate 128 will be at a logical 1 which is fed to NAND gate 130 to provide a logical 0 output to line 136 for the preselected time interval of, say 100 microseconds. Upon completion of the time interval, line 136 transitions to logical 1. This retriggers one-shot multivibrator 54 and continues to do so until the short circuit condition has been removed.

It should be noted that the circuitry illustrated in the drawings may be appropriately modified or simplified in various ways. For example, commercially available integrated circuits, commonly referred to as voltage comparators, may be sustained for transistors 78, 82, 102, and 104, if so desired. This significantly decreases the overall expense of the gap condition detector.

It will be appreciated that both forms of the circuitry of the gap condition detector provides extremely fast response to the current condition in the work gap. This assures that the current to the work gap is shut off almost simultaneously with the detection of a high current condition. This eliminates, or at least greatly minimizes, the possibilities of damage to the workpiece or to the associated work electrode. This is further enhanced by immediate retraction of the work electrode and flushing of the workpiece with an appropriate dielectric fluid. By adjusting the sensitivity control, a reference voltage corresponding to a maximum current may be selected. Since the work current required is dependent upon the particular application, the sensitivity control provides a versatile, highly convenient means of providing protection over a wide current range. It is also noted that the retract time potentiometer may be easily adjusted to set the most appropriate retract time interval for the particular EDM application. It will also be appreciated that by providing a group of current limiting resistors in series with the work electrode and isolated from each other by the above described diode matrix, a wide range of work gap currents may be accommodated, covering a large variety of EDM applications. It is not intended that the gap condition detector of the present invention be limited to the exact circuitry disclosed and furthermore, it may be utilized with EDM systems other than illustrated in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an electrical discharge machining apparatus, a power supply connected across the gap between a workpiece and an electrode by a power switch conducting current pulses to the electrode, means for interrupting said current pulses in response to excessive current flow through the gap, comprising current limiting means connected in series to the gap and the power switch, means for monitoring the volt drop across the current limiting means, reference voltage means for establishing a reference voltage, comparison means connected to said reference voltage means and the monitoring means for detecting a volt drop exceeding said reference voltage to produce an operating signal, and means connected to the comparison means and the power switch for disabling the power supply in response to said operating signal.

2. The combination of claim 1 wherein said current limiting means includes a plurality of resistors connected in series between the power switch and the gap, and a plurality of isolation diodes interconnecting the resistors in parallel to the monitoring means.

3. The combination of claim 2 wherein said power switch includes a plurality of power transistors respectively connected in series with said resistors.

4. The combination set forth in claim 3 wherein said electric discharge machine includes switch means for selectively disconnecting each of said resistors from said power supply whereby the total current required for a particular application may be selectively adjusted.

5. In an electrical discharge machining apparatus, a power supply connected across the gap between a workpiece and an electrode by a power switch conducting current pulses to the electrode under control of a timing control assembly, means for interrupting said current pulses in response to excessive current flow through the gap, comprising selective current limiting means connected in series between the gap and the power switch, means for monitoring the volt drop across the current limiting means, reference voltage means for establishing a preselected reference voltage, comparison means connected to said reference voltage means and the monitoring means for detecting a volt drop exceeding said preselected reference voltage to produce an operating signal, signal transmitting means connecting the comparison means to the timing control assembly for disabling the same in response to said operating signal, and adjustable means connected to the signal transmitting means for maintaining the timing control assembly disabled for a retract period of preselected duration.

* * * * *